(12) United States Patent
Tucker, Jr. et al.

(10) Patent No.: US 7,015,442 B2
(45) Date of Patent: Mar. 21, 2006

(54) FLEXIBLE MICROWAVE COOKING POUCH CONTAINING A RAW FROZEN PROTEIN PORTION AND METHOD OF MAKING

(75) Inventors: Sterling Woodward Tucker, Jr., Fayetteville, AR (US); Leah Kay Wright, Fayetteville, AR (US)

(73) Assignee: Food Talk, Inc., Rogers, AZ (US)

( * ) Notice: Subject to any disclaimer, the term of this patent is extended or adjusted under 35 U.S.C. 154(b) by 0 days.

(21) Appl. No.: 11/029,497

(22) Filed: Jan. 6, 2005

(65) Prior Publication Data

US 2005/0184065 A1    Aug. 25, 2005

Related U.S. Application Data

(60) Provisional application No. 60/534,691, filed on Jan. 8, 2004.

(51) Int. Cl.
*H05B 6/80*    (2006.01)

(52) U.S. Cl. ........................ 219/725; 219/729

(58) Field of Classification Search ............... 219/725, 219/726, 727, 728, 729, 730, 731, 732, 733, 219/734, 735, 620, 625
See application file for complete search history.

(56) References Cited

U.S. PATENT DOCUMENTS

| | | | |
|---|---|---|---|
| 2,555,584 A | 6/1951 | Fairbank | |
| 2,643,952 A | 6/1953 | Crowther et al. | |
| 2,752,252 A | 6/1956 | Condon | |
| 2,801,930 A | 8/1957 | Paulucci | |
| 2,951,965 A | 9/1960 | Robson | |
| 2,969,292 A | 1/1961 | Heller | |
| 3,607,315 A | 9/1971 | Partyka | |
| 3,615,646 A | 10/1971 | Neely et al. | |
| 3,647,508 A * | 3/1972 | Gorrell | 216/87 |
| 3,718,481 A | 2/1973 | Joaquin | |
| 3,808,342 A | 4/1974 | Brandin | |
| 3,873,735 A | 3/1975 | Chalin et al. | |
| 3,881,023 A | 4/1975 | Wilson | |
| 3,911,156 A | 10/1975 | Swanson | |
| 4,328,254 A | 5/1982 | Waldburger | |
| 4,358,466 A | 11/1982 | Stevenson | |
| 4,641,005 A | 2/1987 | Seiferth | |
| 4,735,513 A | 4/1988 | Watkins et al. | |

(Continued)

FOREIGN PATENT DOCUMENTS

CH        684985        2/1995

(Continued)

*Primary Examiner*—Daniel Robinson
(74) *Attorney, Agent, or Firm*—Jacobson Holman PLLC

(57) ABSTRACT

A sealed cooking pouch specifically designed for microwave cooking raw frozen protein entrees containing a raw meat protein portion, preferably beef, poultry, fish, pork or veal, along with starch, sauce and vegetable portions. The packaging material is manipulated into a pouch shape, meant to receive the protein entree ingredients before sealing, during the manufacturing process. The packaging material is composed of a heat-sealable polyester layer with a thin layer of aluminum deposited on one side and a layer of water-repellant 20 lb–25 lb. structural paper stock, laminated together through the use of a water-based adhesive. The aluminum can be uniformly deposited centrally where maximum temperature concentration is desired, and deposited in patterns that allow for temperature attenuation in parts of the package where this is desirable. The structural paper outer layer is treated with a wax emulsion to repel water that forms from condensation on the outside of the cooking pouch.

26 Claims, 5 Drawing Sheets

U.S. PATENT DOCUMENTS

| | | |
|---|---|---|
| 4,867,995 A | 9/1989 | Oaks |
| 4,890,439 A | 1/1990 | Smart |
| 4,911,938 A | 3/1990 | Fisher et al. |
| 4,985,606 A * | 1/1991 | Faller .................. 219/759 |
| 5,059,436 A | 10/1991 | Clark |
| 5,095,186 A * | 3/1992 | Scott Russell et al. ..... 219/730 |
| 5,149,396 A | 9/1992 | Wilson |
| 5,171,950 A * | 12/1992 | Brauner et al. ............ 219/727 |
| 5,223,288 A * | 6/1993 | Mendenhall et al. ....... 426/107 |
| 5,227,599 A | 7/1993 | Mason et al. |
| 5,268,189 A | 12/1993 | Doerter |
| RE34,683 E | 8/1994 | Maynard et al. |
| 5,370,895 A | 12/1994 | Doerter |
| 5,412,187 A | 5/1995 | Walters et al. |
| 5,414,248 A * | 5/1995 | Phillips .................. 219/730 |
| 5,489,766 A | 2/1996 | Walters et al. |
| 5,530,231 A | 6/1996 | Walters et al. |
| 5,679,392 A | 10/1997 | Schegan et al. |
| 5,736,186 A | 4/1998 | Holdren et al. |
| 5,861,184 A | 1/1999 | Ishino et al. |
| 6,054,698 A | 4/2000 | Mast |
| 6,063,423 A | 5/2000 | Virtanen |
| 6,183,789 B1 | 2/2001 | Nilsson et al. |
| 6,488,973 B1 | 12/2002 | Wright |

FOREIGN PATENT DOCUMENTS

| | | |
|---|---|---|
| DE | 29800949 | 5/1999 |
| EP | 0826314 A1 | 8/1996 |
| FR | 2663205 A1 | 12/1991 |
| FR | 2730908 A1 | 8/1996 |
| GB | 676369 | 7/1952 |
| GB | 2240253 | 7/1991 |
| GB | 2 250 408 | 6/1992 |
| JP | 59017943 | 1/1984 |
| JP | 1168247 | 7/1989 |
| JP | 9191860 | 7/1997 |
| JP | 9313135 | 12/1997 |

* cited by examiner

FLEXIBLE MICROWAVE COOKING POUCH CONTAINING A RAW FROZEN PROTEIN PORTION AND METHOD OF MAKING

This is a complete application claiming the benefit of and priority from U.S. provisional application Ser. No. 60/534,691 filed Jan. 8, 2004.

BACKGROUND OF THE INVENTION

1. Field of the Invention

The invention relates to microwave active food packaging for containing and facilitating the cooking of frozen raw protein, along with a starch, sauce and vegetable which form a complete frozen food entree, in the microwave oven.

2. Description of the Related Art

Microwave susceptor packaging for food products has been in use for many years. Used primarily in the frozen food industry, some of the more common uses of this packaging technology are for browning pastry dough, such as found on a Chicken Pot Pie, microwave popcorn bags, or layered on a cardboard disc for browning the underside of a frozen pizza crust.

In U.S. Pat. No. 6,488,973 (inventor: Wright) incorporated in its entirety by reference herein, standard flexible susceptor packaging use was expanded to include cooking raw frozen meat proteins with sauces and/or stuffing with vegetables. In this embodiment, a thin layer of aluminum, which acts as a microwave conductive material, is deposited onto one side of a heat sealable clear polyester laminate. This deposited aluminum side of the polyester layer is then adhered to a structural paper layer through the use of a water-based adhesive. This microwave susceptor flexible packaging on long rollstock is then run through a heat sealing packaging machine, such as a Doboy® Horizontal Sealing machine, which wraps and seals the flexible susceptor packaging around the protein and sauce food constituents, forming a convenient microwavable pouch.

While this invention was a novel and innovative application for flexible susceptor packaging materials, there were still some improvements that were desirable. For example, if the frozen food package were subjected to temperature abuse, i.e. freezing and thawing prior to its intended use, the structural paper outer laminate layer would become wet and could separate from the aluminum deposited polyester (susceptor) layer. This is due to the water-based adhesive, which must be used to bind the laminate layers in food packaging of this type, losing its bond in the presence of water. When this bond is lost, with no structural paper layer to support the underlying aluminum deposited polyester layer (the susceptor), the susceptor layer would distort and tear when producing heat in the presence of microwave energy, in a microwave oven.

Another shortcoming in the flexible susceptor packaging material that was described in the '973 patent was that the aluminum susceptor was deposited uniformly across the length and width of the web. Where the material was folded along the sides to form a pouch, foodstuff close to the this fold would often burn, scorch or become dried out, due to the intense heat that was produced in the proximity of this fold. This was due to two sides of the microwave susceptor material coming into close contact with one another, producing a tremendous concentration of reflected and conducted microwave energy and heat.

Further, the method specified to make the foodstuff-containing pouch did not describe the automated machinery that could be used to make a cooking pouch described in the preferred embodiment of the Wright patent. Commercially available or specially designed automated machinery can be used to speed the production of the protein foodstuff-containing pouches, thus creating efficiencies.

Finally, utilizing partially cooked (blanched) starches, such as pastas or rice, as a bed under which the protein portion and sauce can be deposited, could enhance the consumer perception of value for this frozen entree, while contributing a very small cost to the entrée.

SUMMARY OF THE INVENTION

The present invention relates to a flexible microwave cooking pouch formed from a multilayer elongated sheet preferably from continuous rollstock. The microwave cooking pouch is intended to wrap around and seal a frozen block of raw protein, including a liquid sauce, and further including, optionally, a starch and vegetable, which frozen block forms a complete frozen food entrée. The block is formed similar to that described in the '973 patent. That is, the block is formed by depositing the foods in a confined tray or other confined surface and the food is frozen to form a block or puck having a height that is substantially less than the length and width of the block.

The multi-layer elongated sheet has a paper outer layer and a plastic coating inner layer with a partially-metallized layer of microwave conductive material deposited therebetween. The partially-metallized layer includes a central section that is completely metallized, i.e., entirely coated with microwave conductive material, such as aluminum, having a width less than the width-wise dimension of the frozen block and a pair of partially-metallized sections, one on either side of the central section having a width sufficient to extend around the edge of the food block and overly the top of the food block. Adjacent each of the partially metallized sections is a pair of completely unmetallized edges, one on each side, that form a fin seal.

In the present invention, the pouch is formed by placing the frozen food block upon the completely metallized section of the sheet, folding the sheet longitudinally around the block, such that the partially metallized sections lie adjacent the edges of the food block and overly the top of the food block, wherein the edges are sealed together to form a fin seal. The sheet is then cut transversely and sealed to form opposite ends of the pouch. The strength of the seal at the ends is greater than the fin seal so that as a predetermined pressure is built up within the cooking pouch, the fin seal will open first to enable pressure to escape therethrough while leaving the end seals intact.

It is thus an object of the invention to provide a distinctive improvement in the type of flexible susceptor packaging material used, as well as providing improvements in the method of making the protein foodstuff-containing pouch, which can further be automated for improved manufacturing efficiency. It is also the object of this invention to allow for greater flexibility in the constituent ingredients, thereby enhancing the perceived value of the frozen food entree.

DESCRIPTION OF THE PREFERRED EMBODIMENT

Figure 1A:
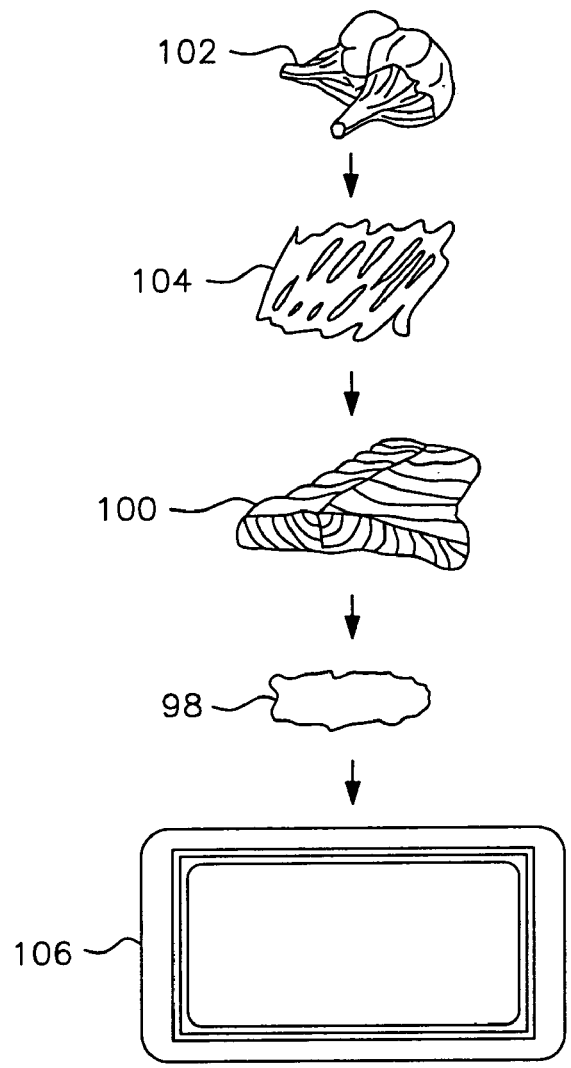
FIGS. 1(a) and 1(b) depict the steps of depositing the foodstuffs onto a dimensionally confined tray and the resultant frozen block, respectively.
Figure 1B:
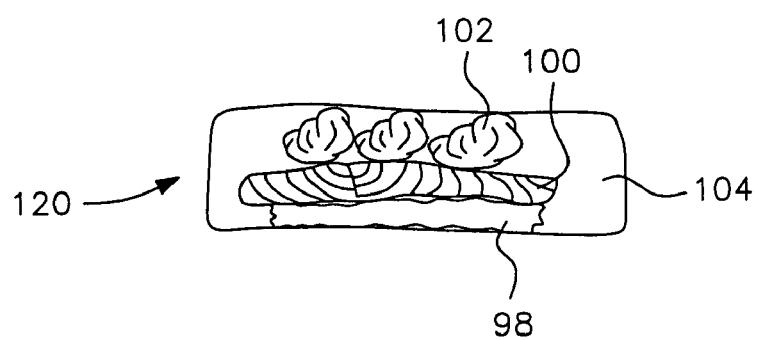
Figure 2:
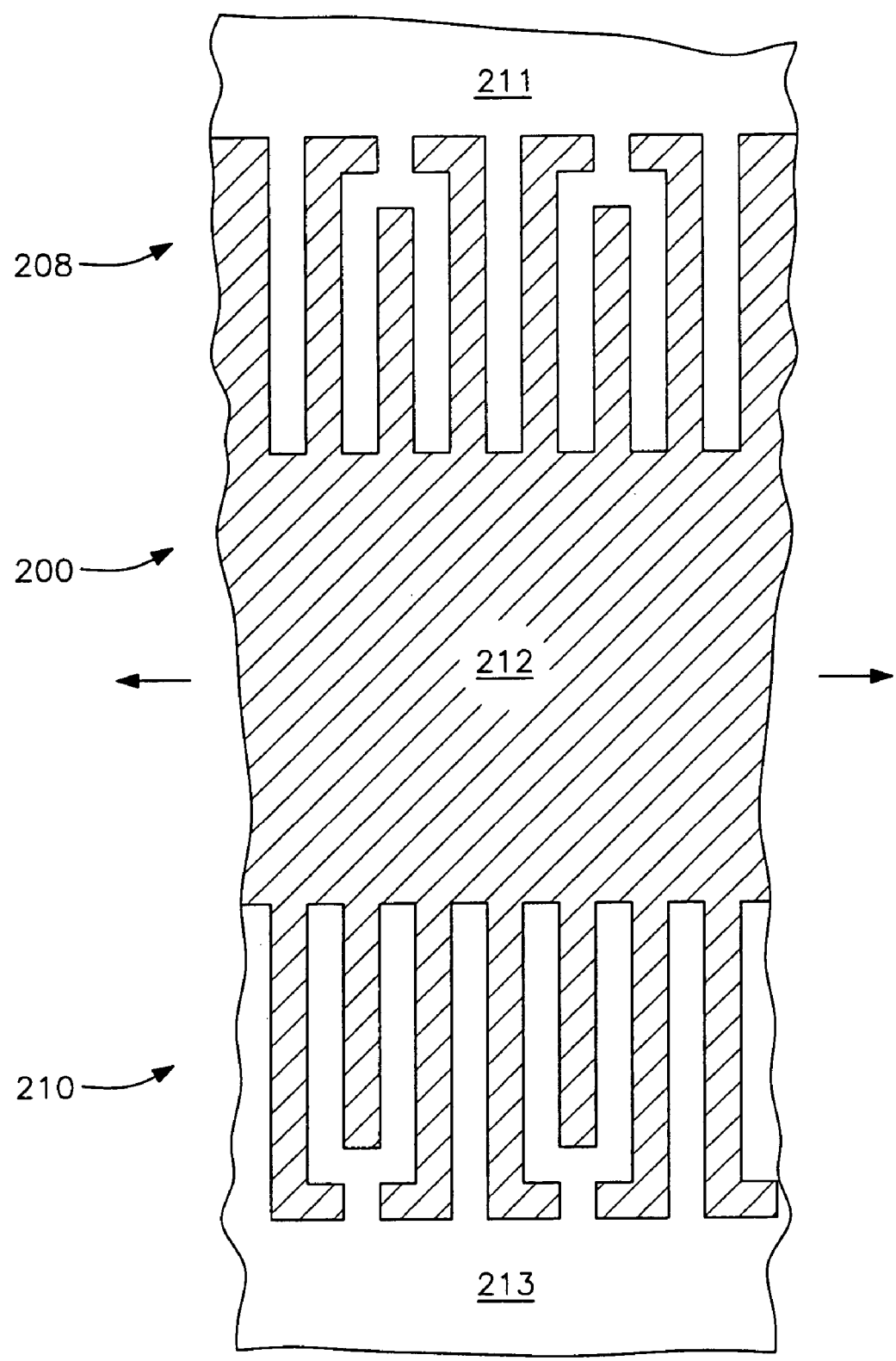
FIG. 2 is a top view of a not to scale multilayer sheet used to form a cooking pouch.
Figure 7:
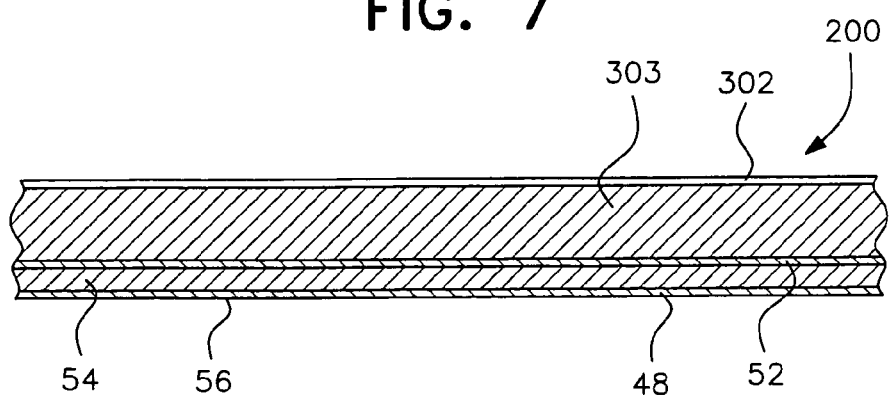
FIG. 7 is a cross-section of the sheet material used to form the cooking pouch.

The susceptor laminate sheet raw material 200 that is used to form the cooking pouch 300, as well as the specifications of the forming of the pouch itself are important to the success and performance of cooking raw frozen proteins entrees. The flexible susceptor laminate sheet material as shown in FIGS. 2 and 7 comprises an outer layer 303 of 20 lb.–25 lb. grease resistant Kraft type paper, with a thin layer of a waxy emulsion 302 applied to what will be the outside of the cooking pouch. See FIG. 7. A water-based laminating adhesive 52 is used to bond this outer structural paper layer 303 to an aluminum deposited (metallized) 48 gauge heat-sealable layer 354 with a polyester coating layer 56. The laminates are arranged so that the aluminum deposited side of the polyester is bonded to the paper layer, so that the FDA allowed polyester material only comes in contact with the foodstuff, on what will become the interior the pouch.

Flexible susceptor laminate sheet materials of uniform metallized area over the entire surface of the sheet used to form the pouch are known. See, e.g. the Wright '973 patent incorporated by reference herein. These completely metallized sheet materials are not optimum for cooking raw frozen protein entrees. Further, as a practical matter, temperature abuse does occur during shipping and handling, both during the distribution chain and by the end consumer. When a frozen product is inadvertently warmed, condensation that forms on the outer paper layer of a standard susceptor film will destroy the bond between the structural paper layer and the aluminum deposited susceptor layer, leading to destruction of the integrity of the pouch. When this happens, leakage of the constituent food ingredients can happen, along with degradation of the cooking performance of the pouch. Coatings of natural water repellant emulsions 302 are used in this invention to coat the external side of the structural paper web. When condensation or water from thawed ice comes in contact with the thin water repellant layer of the paper, the repellant layer sheds the water, rather than allowing the water to soak into the paper and destroy the water adhesive bond between the paper laminate layer and the aluminum deposited polyester (susceptor) layer. This is accomplished by applying a waxy emulsion to the external side of the paper laminate through the use of a drum (not shown) with microscopic pits or "cells" which deposit the emulsion 302 on one side, and another drum (not shown) on the other side providing support to squeeze any excess emulsion off of the paper laminate, except for what is in the cells on the drum on the depositing side. A very thin coating is desired, which would only fill the natural texture porosity of the paper web. It is important to note that a natural waxy emulsion that is allowed by FDA regulations for food use, is utilized in this application.

Another feature of the present invention is the prevention of excessive heat build-up. Because it is desirable that some of the heat at the sides and corners of the pouch be controlled and attenuated, due to the scorching, drying or burning of the ingredient protein, starch, or sauce components of the protein entree that can occur, this invention incorporates a partially de-metallized pattern along the sides 208, 210 of the susceptor layer of the packaging. By providing a solid and uniform strip of susceptor 212 at the central section where the greatest mass of the foodstuff (food load) is, in the center of the bottom of the package, and a partially de-metallized area along the sides, 208, 210 edges and corners of the package, heat can be regulated within the cooking pouch to distribute the most intense conductive and reflective microwave energy and, thus heat, in the desired area where the maximum food load is, and attenuate the heat along the sides, edges and corners, where there is the least concentration of the food load. See FIG. 8 which shows partially de-metallized area at edges. The food rests in the central area 212. The amount of susceptor in this partially metallized side and corner area would depend on the type of food being cooked and the amount of food that would be deposited in these areas. A metalization coverage pattern of between 40% and 60% in this area is deemed ideal for most protein, starch and sauce entrees.

Figure 8:
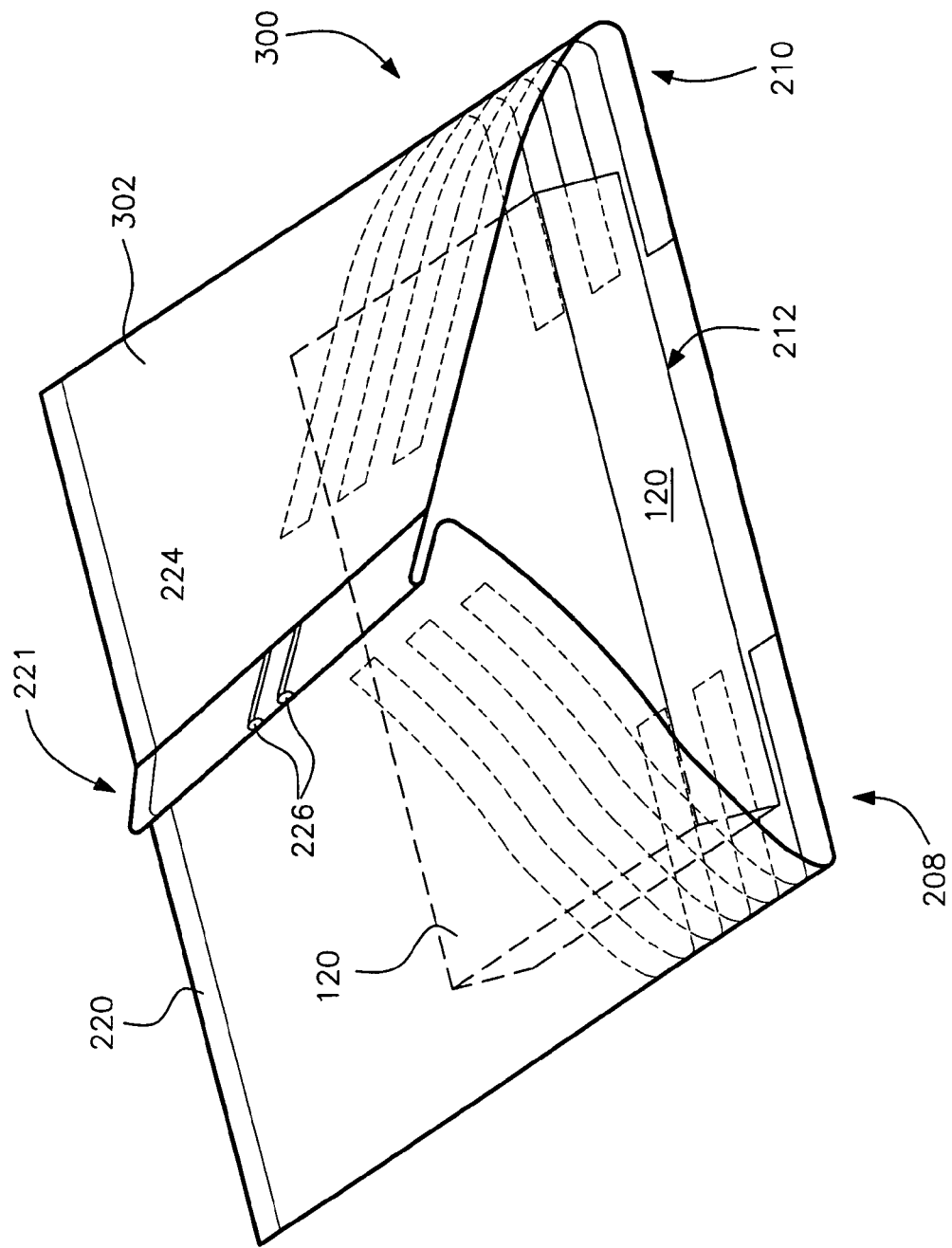
FIG. 8 is a perspective view of an open ended cooking pouch.

The completely metallized central section 212 is depicted in FIG. 2 as having a width transverse to the length of the sheet of 4 inches with the partially-metallized sections 208, 210 having a width of 2⅞ inches. The end edges which form the fin seals are depicted as 1¼ inches. These are preferred and, obviously, may be altered. What is important is that the central section width be less than the width of the underside of the frozen block 120 so that the block 120 overlies the central section and partially overlies the partially-metallized sections 208, 210. Thus, each of the partially-metallized sections 208, 210 have a width less than the overall width of the central section, but greater than one-half of the width of the central section. This enables the sheet, when folded over the block, as best seen in FIG. 8, to have the partially-metallized sections extending around the edges of the block and overlying the top of the block. Then, the fin seal is formed.

This partial-demetalization of the aluminum susceptor itself is accomplished by a chemical etching process during the manufacturing of the susceptor film laminate stock. See U.S. Pat. No. 4,735,513 (Inventor: Watkins et al.). This partial-demetalization of the susceptor can result in any pattern desired. Examples range from a repeating geometric pattern as shown in FIG. 2, to pictures of fish, chicken, cows or pigs for protein producing companies. A company name, logo or trademark could be patterned in the partially de-metallized susceptor. These designs lend impact and marketability to the cooking pouch product. The important concept here is that an approximately 4–5 inch wide solid susceptor be deposited along the center of the web at 20, with 40% to 60% coverage de-metallized susceptor pattern radiating from that solid strip to approximately one inch from each side of the web width which is entirely demetalized. The approximately one inch, on either side edge of the web, is completely de-metallized so as to not raise the temperature in that area while cooking, in order to maintain the integrity of the fin seal, and to provide a relatively cool surface that may be handled by the consumer after cooking. The center positioning and width of the solid susceptor strip along with the 40%–60% de-metallized pattern coverage along what will be the sides of the pouch are important to the optimum performance of the cooking pouch.

It is important, during cooking, that the end seals 220, 222 remain sealed and any excess steam pressure be relieved, instead, through ruptures that form a small opening or openings 226 that will form in the fin seal 224 at the top of the cooking pouch. Through this invention the desirable end seals are achieved by the specification and use of specially designed crimper sealing jaws 402, 404 and cutting knife 502 that would be used on a commercial sealing machine, such as a horizontal film sealer for instance, that is used to form the cooking pouch from the susceptor laminate sheet material. Because there is an overlap of layers of the laminate web stock in the middle of the formed cooking pouch at 221, where the fin seal is formed, there is a need for an offset relief 406 that would accommodate this additional thickness, where the crimper jaws come together to form the heat seal in either end of the formed cooking pouch. This offset would ensure that the sealing crimper jaws could seal completely across the end of the formed cooking pouch, without "rocking" to one side or the other, as a result of this additional thickness in the center of the formed pouch. This crimper jaw set has a one-inch wide relief in the center of the jaws, with a depth equal to twice the thickness of the laminate sheet material, to accommodate the additional thickness of the fin seal area described above. A typical depth is 0.0050 inches.

Figure 9:
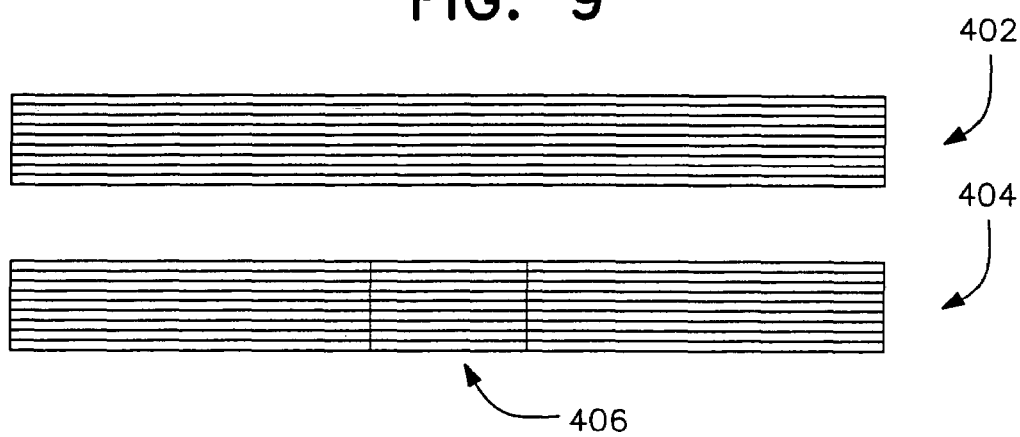
FIG. 9 is a top view of crimper jaws used to crimp the end seals.
Figure 10:
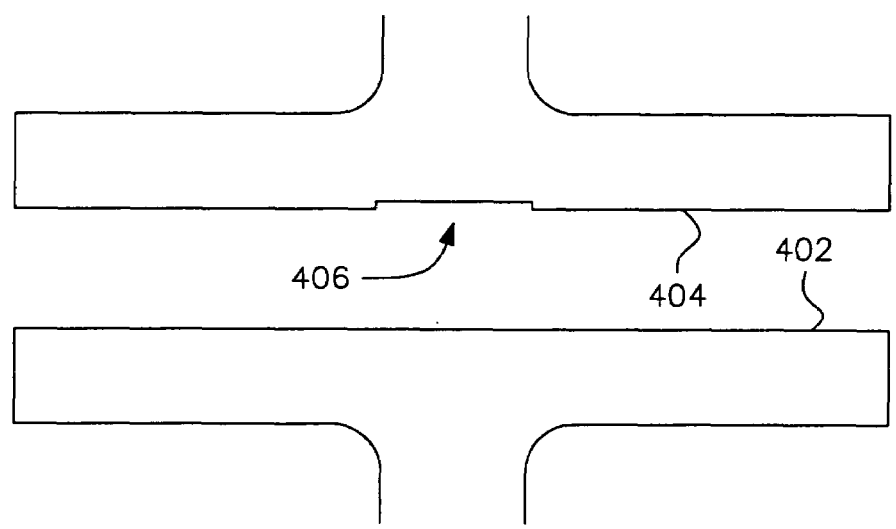
FIG. 10 is a side view of the top and bottom crimper jaws.
Figure 11:
FIG. 11 is a partial notched cutting knife used to form a notch in the end seal.

Specifically, it is desired that a 1½ inch to ⅝ inch wide end seal be formed on each end, after the pouch is formed around the raw frozen food product. The end seal could be wider but, if narrower, a risk of rupture and leakage would exist. This seal is optimally one of a transverse nature, sealing perpendicularly to the longitudinal direction of the interior cavity of the formed pouch. A 10 tooth per inch transverse pattern as shown on the jaws 402, 404, FIG. 9, will be considered optimum for this laminate sheet raw material, to be used in a commercial sealing machine. This seal is also achieved by the use of the specially designed and machined crimper jaw set for the sealing machine. Additionally, a specially machined ⅜ inch wide hot fin wheel is utilized to form a fin seal ideally ⅜ inch in width. This width has shown to be optimum to provide pouch sealing through the distribution and merchandising of the product, while allowing for self-venting, in the event of excess steam buildup during the cooking process. Thus, the end seals must be stronger than the fin seal. During cooking, internal pressure results in channels or openings 226 forming in the fin seal 224 while the end seals 220, 222 remain fully sealed. The overall width of the "fin" may be greater than the fin sealed portion. For example, as shown in FIG. 2, the fin seal area 211, 213 that has no suspector is approximately 1¼ inch in width. The overall fin seal may be of less width. Significantly, the actual "sealed" width is even less. It has been empirically determined that an optimum width, as discussed above, is ⅜ inch which will be sufficiently strong to maintain integrity of the pouch under transport and microwave cooking conditions, yet enable some openings or ruptures 226 in the seal to form during cooking to relieve excessive steam pressure.

Figure 3:
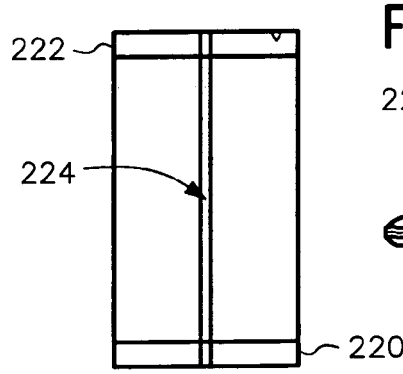
FIG. 3 is a top view of a cooking pouch formed from the sheets of FIG. 2.
Figure 4:
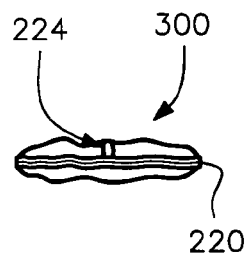
FIG. 4 is an end view of a cooking pouch.
Figure 5:
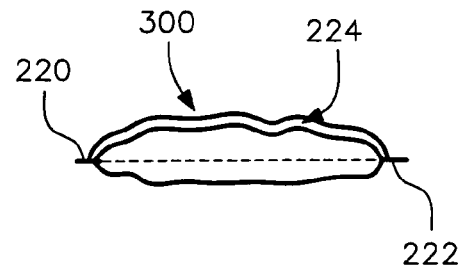
FIG. 5 is a side view of a cooking pouch.
Figure 6:
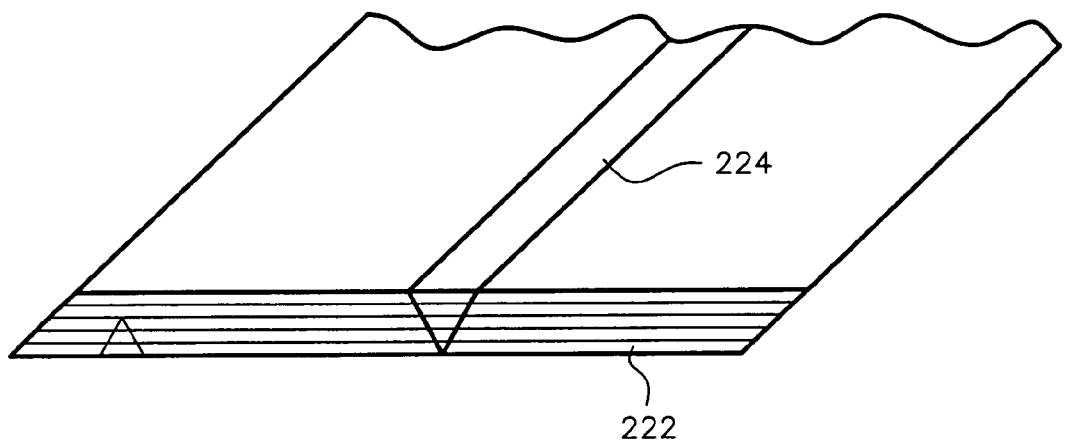
FIG. 6 is an end portion of a cooking pouch showing a notch in a corner of the transverse end seal.

A specially designed and machined cutting knife 502 with a V-shaped notch in one side is also installed in the commercial sealing machine. This is used to cut the pouch's laminate sheet material, after forming the pouch. The V-shaped notch will create a notch in one end seal that will allow a consumer to tear open the pouch by hand, rather than necessitating cutting it open with scissors. See the notch in FIGS. 3 and 6.

In the preferred embodiment manufacturing process, a starch portion 98, if desired, is first deposited in a vessel or tray such as 106 or other dimensionally confined surface. Then, frozen or thawed raw, uncooked protein portions 100, preferably beef, poultry, fish, pork or veal, are deposited, either by hand or through automation, into the vessel. Then a liquid sauce portion 104 is deposited, either by hand or through automation, on top of the protein 100 and starch 98 portions. Preferably, at least one of the protein or the sauce contains a fat to aid in cooking. Finally, if desired, partially cooked vegetables 102 can be deposited, either by hand or through automation, onto the starch, protein and sauce portions.

This vessel or tray 106 can either be part of a continuous feed transport mechanism, or a disposable or re-usable tray on a conveyor belt. The vessel must be sealed on the bottom, so as not to allow liquid sauce to leak out. This vessel would have sides tall enough to hold all the constituent ingredients. After the entree ingredients are deposited into the vessel, the vessel is transported through a freezing station, where the ingredients are frozen together into a frozen block or "puck". This freezing station can be either a liquid nitrogen tunnel, where liquid nitrogen is sprayed onto the entree ingredients, almost instantly freezing the components together, or a commercial spiral freezer, whereby the entree ingredients, along with the containing vessel, are transported through a convection-freezing environment. After the ingredients are frozen, they are removed from the containing vessel. The ingredient block or "puck" is then transported to the pouch sealing station on a conveyor. The sealing station is a commercially available sealing machine, such as a Doboy® Horizontal Sealing machine. The sealing machine forms the pouch by wrapping the susceptor laminate sheet around the frozen block that is centrally located on the sheet, cuts the sheet and then heat-seals the pouch to form the fin seal 224 and end seals 220, 222 through the use of the parts described above or other suitable structures. The cooking pouch, with the frozen raw protein entree sealed inside, is then ready for cartoning.

Alternatively, the pouch can be formed on a vertical form fill sealer. When formed on a vertical form fill sealing machine, one end is sealed, through the use of said sealing jaws described above. The other end of the pouch is left open and premeasured portions of Individually Quick Frozen (IQF) starch, frozen protein, IQF sauce pellets and IQF vegetables are deposited down chutes and drop into the pouch. The open end of the pouch is then sealed and is ready for cartoning.

What is claimed is:

1. A packaged microwaveable food product comprising a frozen block of food formed of raw protein and a liquid sauce, said frozen block sealed in a cooking pouch formed from a multilayer elongated sheet having a predetermined width defining free width edges, the width transverse to the sheet length, said sheet comprising an outer paper layer with a water-repellent coating thereon, a plastic coating inner layer and a partially-metallized layer between the paper outer layer and the plastic coating inner layer, wherein said partially-metallized layer comprises a completely metallized central section located substantially centrally in the sheet and having a width less than the dimension of the frozen block, a pair of partially metallized sections lying one on either side of the completely metallized central section, each partially metallized section having a width sufficient to extend around the edge of the food block and overly the top of the food block, each of said partially metallized sections having a substantially uniform metallized coverage pattern between 40% and 60% of the overall area of each partially metallized section, and a pair of completely unmetallized edges extending from the pair of partially metallized sections to the free width edges of the sheet, wherein said pouch is formed by placing the frozen block upon the completely metallized central section with the edges of the block overlying portions of the partially metallized section, folding the sheet around the block such that the partially metallized sections lie adjacent the edges of the block and overly the top of the block, sealing the unmetallized edges together to form a fin seal, cutting the wrapped sheet transversely to form opposite ends of the pouch and sealing the ends transversely to form opposite end seals.

2. The packaged microwaveable food product of claim 1, wherein the end seals have a greater resistance to internal pressure than the resistance of the fin seal such that a predetermined pressure built up in the cooking pouch will escape through ruptures in the fin seal while leaving the end seals intact.

3. The packaged microwaveable food product of claim 2, wherein the width of the central section is less than the combined widths of the pair of partially metallized sections.

4. The packaged microwaveable food product of claim 3, wherein said partially metallized layer is affixed to the paper outer layer by an adhesive.

5. The packaged microwaveable food product of claim 4, wherein the adhesive is a water-based laminating adhesive.

6. The packaged microwaveable food product of claim 1, wherein the plastic coating inner layer is a heat-sealable polyester layer.

7. The packaged microwaveable food product of claim 1, wherein the metallized coverage pattern is a repeating geometric pattern.

8. The packaged microwaveable food product of claim 1, wherein the metallized coverage pattern is a repeating company name, logo, or mark.

9. The packaged microwaveable food product of claim 1, wherein said multilayer sheet is formed from continuous rollstock.

10. A flexible multilayer sheet structure for forming a packaging and cooking pouch for a microwave frozen food product, said structure comprising a multilayer elongated sheet having a predetermined width defining free width edges, the width transverse to the sheet length, said sheet comprising an outer paper layer with a water-repellent coating thereon, a plastic coating inner layer and a partially-metallized layer between the paper outer layer and the plastic coating inner layer, wherein said partially-metallized layer comprises a completely metallized central section located substantially centrally in the sheet, a pair of partially metallized sections lying on either side of the completely metallized central section, each partially metallized section having a width less than the width of the central section and greater than one-half the width of the central section, each of said partially metallized sections having a substantially uniform metallized coverage pattern between 40% and 60% of the overall area of each partially metallized section, and a pair of completely unmetallized edges extending from the pair of partially metallized sections to the free width edges of the sheet.

11. The sheet structure of claim 10, wherein the width of the central section is less than the combined widths of the pair of partially metallized sections.

12. The sheet structure of claim 10, wherein said partially-metallized layer is affixed to the paper outer layer by an adhesive.

13. The sheet structure of claim 12, wherein the adhesive is a water-based laminating adhesive.

14. The sheet structure of claim 10, wherein the plastic coating inner layer is a heat-sealable polyester layer.

15. The sheet structure of claim 10, wherein the metallized coverage pattern is a repeating geometric pattern.

16. The sheet structure of claim 10, wherein the metallized coverage pattern is a repeating company name, logo, or mark.

17. A packaged microwaveable food product comprising a frozen block formed of raw protein and a liquid sauce, said frozen block sealed in a cooking pouch formed from a multilayer elongated sheet having a predetermined width defining free edges extending along the length of the sheet, the width transverse to the sheet length, said sheet comprising an outer paper layer, a plastic coating inner layer and a partially-metallized layer between the paper outer layer and the plastic coating inner layer, wherein said partially-metallized layer comprises a completely metallized central section located substantially centrally in the sheet and having a width less than the dimension of the frozen block, a pair of partially metallized sections lying on either side of the completely metallized central section, each partially metallized section having a width sufficient to extend around the edge of the food block and overly the top of the food block, each of said partially metallized sections having a substantially uniform metallized coverage pattern between 40% and 60% of the overall area of each partially metallized section, the remaining area being unmetallized, and a pair of completely unmetallized edges extending from the pair of partially metallized sections to the free edges of the sheet, said frozen block lying upon the completely metallized central section with the edges of the block overlying portions of the partially metallized section, said partially metallized sections extending around the edges of the block and overlying the top of the block, the unmetallized edges sealed together to form a fin seal, and a pair of end seals formed in opposite ends of the pouch by heat sealing.

18. The packaged microwave food product of claim 17, wherein the paper layer is coated with a water repellant coating.

19. The packaged microwaveable food product of claim 17, wherein the end seals have a greater resistance to internal pressure than the resistance of the fin seal such that a predetermined pressure built up in the cooking pouch will escape through ruptures in the fin seal while leaving the end seals intact.

20. The packaged microwaveable food product of claim 17, wherein the metallized coverage pattern is a repeating geometric pattern.

21. The packaged microwaveable food product of claim 17, wherein the metallized coverage pattern is a repeating company name, logo, or mark.

22. The packaged microwaveable food product of claim 17, wherein said frozen block has a predetermined length and width and a height substantially less than the length or width.

23. A method of making a packaged microwaveable food product for cooking the food product within the package in a microwave oven through the microwave energy, the buildup of steam pressure, and heat transfer comprising:

forming a single frozen solid block food portion comprising a raw protein food product portion and a sauce portion by depositing a raw protein food portion and a liquid sauce portion on a contained surface, and then freezing the raw protein food portion and sauce portion to form said single frozen solid block dimensionally confined to the dimensions of said contained surface;

removing said frozen solid block from said contained surface;

forming a pouch around the frozen solid block by enclosing said block within a sheet material having a paper outermost layer and a plastic coated metallic susceptor layer located internally of said paper layer, said plastic coated metallic susceptor layer comprising a completely metallized central section located substantially centrally in the sheet material and having a width less than the dimension of the frozen block, a pair of partially metallized sections lying on either side of the completely metallized central section, each partially metallized section having a width sufficient to extend around the edge of the food block and overly the top of the food block, each of said partially metallized sections having a substantially uniform metallized coverage pattern between 40% and 60% of the overall area of each partially metallized section, and a pair of completely unmetallized edges extending from the pair of partially metallized sections, said forming step comprising placing the frozen solid block upon said completely metallized section and then wrapping the sheet material around the block such that the partially metallized sections lie adjacent the edges of the block and overly the top of the block, sealing the unmetallized edges together to form a fin seal, cutting the wrapped sheet transversely to form opposite ends of the pouch and sealing the ends transversely to form opposite end seals.

24. The method of claim 23, further comprising the step of maintaining the pouch filled with said frozen solid block in a frozen condition until cooking, wherein said frozen block is cookable in a microwave oven within the enclosed cooking pouch by microwave energy absorption, by steam pressure build-up, and by heat conducted from said metallic susceptor.

25. The method of claim 23, wherein at least one of said raw protein food product and said sauce contains a fat.

26. The method of claim 23, wherein said liquid sauce contains a fat.

* * * * *